United States Patent [19]

Watson

[11] 4,110,222

[45] Aug. 29, 1978

[54] APPARATUS FOR SEPARATING MAGNETIZABLE PARTICLES FROM A FLUID

[75] Inventor: James Henry Peter Watson, St. Austell, England

[73] Assignee: English Clays Lovering Pochin & Company Limited, Cornwall, England

[21] Appl. No.: 675,885

[22] Filed: Apr. 12, 1976

[30] Foreign Application Priority Data

Apr. 11, 1975 [GB] United Kingdom ............... 15079/75

[51] Int. Cl.[2] ............................................. B01D 35/06

[52] U.S. Cl. ................................ 210/222; 209/223 R; 209/232

[58] Field of Search ........................ 209/223, 224, 232; 210/222, 223

[56] References Cited

U.S. PATENT DOCUMENTS

| | | | |
|---|---|---|---|
| 3,503,504 | 3/1970 | Bannister | 209/223 |
| 3,567,026 | 3/1971 | Kolm | 210/222 |
| 3,627,678 | 12/1971 | Marston | 210/222 |
| 3,770,629 | 11/1973 | Nolan | 210/222 |
| 3,819,515 | 6/1974 | Allen | 210/222 |
| 3,887,457 | 6/1975 | Marston et al. | 210/222 |
| 3,920,543 | 11/1975 | Marston | 210/222 |

OTHER PUBLICATIONS

Magnetic Properties of the Nickel-Iron-Alloys. -U.S. Pat Ofc. Sci. Library-Jan. 1950, T. A. 479.

*Primary Examiner*—Theodore A. Granger
*Attorney, Agent, or Firm*—Armstrong, Nikaido, Marmelstein & Kubovcik

[57] ABSTRACT

The apparatus comprises a magnet for establishing a magnetic field in a first zone, and a separating chamber. The separating chamber is provided with an inlet and an outlet for fluid and contains a fluid-permeable packing of magnetisable material between the inlet and the outlet. One or more parts of the separating chamber consist of magnetic field concentrating means constituted by ferromagnetic material. This part (or each of these parts) would otherwise occupy a region of relatively low magnetic field intensity when the separating chamber is within the first zone and a magnetic field was established in the first zone by means of the magnet. The remainder of the separating chamber consists of substantially non-magnetisable material. Means are provided for moving the separating chamber into, and out of, the first zone and for passing fluid containing magnetisable particles through the separating chamber when within that zone so that magnetisable particles are magnetised and captured in the packing. Means are provided for removing the captured particles from the packing when the separating chamber is in a second zone remote from the first zone.

17 Claims, 3 Drawing Figures

APPARATUS FOR SEPARATING MAGNETIZABLE PARTICLES FROM A FLUID

BACKGROUND OF THE INVENTION

This invention relates to apparatus for separating magnetisable particles from a fluid in which they are suspended.

Known apparatus for separating magnetisable particles from a fluid in which they are suspended essentially comprises a separating chamber of non-magnetisable material and a magnet for establishing within the separating chamber a zone of high magnetic field intensity. The separating chamber has a fluid inlet and a fluid outlet and is loosely packed with a fibrous or particulate ferromagnetic material in order to provide within the chamber, when acted upon by the magnet, a large number of points of high magnetic field intensity separated by regions of lower intensity so that the local magnetic intensity within the separating chamber changes rapidly with distance. In operation a slurry containing a mixture of particles of relatively high magnetic susceptibility and particles of relatively low magnetic susceptibility is passed through the separating chamber from the inlet to the outlet thereof whilst a high intensity magnetic field is established in the region of the chamber, so that the particles of relatively high magnetic susceptibility are magnetised and attracted to, and retained on, the ferromagnetic packing material and in this way a separation of the particles of relatively high magnetic susceptibility from the particles of relatively low magnetic susceptibility can be achieved.

In order to establish a field of sufficient intensity in the region of the separating chamber and its packing material, the separating chamber is conveniently positioned in the zone of highest intensity of a magnetic field generated by a magnet. An arrangement which has been found to be very suitable in practice is to place a separating chamber of cylindrical shape within the central bore of an electromagnet coil in the form of a solenoid. In this arrangement the lines of magnetic force are generally parallel to the longitudinal axis of the coil and thus of the separating chamber. One disadvantage of this arrangement is that, although the magnetic field is substantially parallel to the longitudinal axis near the middle of the length of the coil, near the ends of the coil the field tends to "fan out" with consequent reduction in field intensity in these regions and dissipation of energy. As a result the average magnetic field intensity within the separating chamber is lowered and the separation efficiency of the separating chamber is decreased. The tendency for the field to fan out at the ends of the coil may be at least partially corrected by providing the coil with extra turns at its ends to increase the intensity of the field in these regions. This solution is, however, expensive especially when the electromagnet is of the superconducting type and the whole of the conductor constituting the coil, including the extra turns at the ends, must be cooled to a temperature which is little higher than absolute zero. Also, the provision of extra turns at the ends of the coils of a superconducting electromagnet, with a consequent increase in the outer diameter of the coil, would present problems in the design of the cryogenic apparatus which would be difficult and expensive to overcome.

SUMMARY OF THE INVENTION

According to the present invention, there is provided apparatus for separating magnetisable particles from a fluid in which they are suspended, which apparatus comprises: a magnet for establishing a magnetic field in a first zone; at least one separating chamber having a fluid inlet and a fluid outlet and a fluid-permeable packing of magnetisable material disposed between the inlet and outlet, the separating chamber having at least one part thereof comprising a magnetic field concentrating means of ferromagnetic material, wherein when the separating chamber is within the first zone and a magnetic field is established in the first zone, the concentrating means is positioned in a region in the magnetic field which would otherwise be of relatively low intensity, and the remainder of the separating chamber other than the part comprising the concentrating means comprises a substantially non-magnetisable material; means for moving the separating chamber into, and out of, the first zone; means for passing fluid having magnetisable particles suspended therein through the separating chamber through the inlet thereof, when it is positioned within the first zone and a magnetic field is established in the first zone, so that magnetisable particles are magnetised by the magnetic field and attracted to, and retained in, the packing, whilst the fluid passes through the packing and exits through the outlet; and means for removing the magnetisable particles retained in the packing, when the separating chamber is positioned in a second zone remote from the first zone.

The field concentrating means is preferably constituted by a solid mass of ferromagnetic material containing substantially no voids. If the mass of the ferromagnetic material constituting the field concentrating means does contain voids, the voids should occupy at most 50% of the total volume occupied by the mass of ferromagnetic material. This contrasts with the voidage of the porous packing of magnetisable material which is between 60 and 98%, and preferably between 80 and 98%, of the total volume occupied by the packing.

In the case of the separating chamber being elongate, the parts of the separating chamber which are constituted by the field concentrating means are preferably in the vicinity of the ends of the separating chamber. Conveniently these parts are end walls of the separating chamber. The fluid inlet and the fluid outlet preferably extend through at least one of these end walls. In one embodiment, the fluid inlet is constituted by one or more apertures through one end wall, and the fluid outlet is constituted by one or more apertures through the other end wall. The end walls may even be in the form of grids which are pervious to the fluid containing magnetisable particles.

Advantageously each end wall is constituted by a plate made of ferromagnetic material. In the case of the separating chamber being generally cylindrical, the plates are preferably circular in shape and have a diameter corresponding to the diameter of the separating chamber (for example 2 feet). In the case of the separating chamber being generally prismatic, the plates are preferably of the shape of the cross-section of the separating chamber. The thickness of the plates is generally between 3 and 150 mm, and preferably between 3 and 30 mm.

When the separating chamber is disposed in a magnetic field, the plates are advantageously transverse to the magnetic flux lines. By way of example, if a magnetic field is established in such a separating chamber by introducing the separating chamber into the central bore of an electromagnet coil of the solenoid type with the longitudinal axis of the separating chamber parallel to the bore, the lines of magnetic flux in the middle of the separating chamber will be parallel to the axis of the separating chamber, and, as long as the ferromagnetic material constituting the plates is not magnetically saturated, the lines of magnetic flux will tend to enter the ferromagnetic plates normally to the surface of the plates and then to bend so as to travel in the plane of the plates. If the ferromagnetic material is saturated the magnetic flux lines are refracted as they pass through the plates.

The ferromagnetic material of the field concentrating means should be easily magnetisable. It should therefore be a soft material, that is a material of low coercivity (less than $10^3$ A m$^{-1}$). The ferromagnetic material preferably has a high relative permeability $\mu r$ at the magnetic field intensities at which it is intended to be used. Since the value of the relative permeability $\mu r$ of most such materials increases as the applied magnetic field intensity is increased until it reaches a maximum and then decreases as the applied magnetic field intensity is further increased until the material is magnetically saturated, the saturation polarisation $J_s = (B - \mu o \, . \, H)_s$ of the material is also preferably high, where $B$ is the flux density and $H$ is the magnetic field intensity at saturation, $\mu o$ being the permeability of free space. Most preferably the relative permeability reaches a maximum at the magnetic field intensity at which the ferromagnetic material is intended to be used, the magnetic field intensity at which the material saturates being greater than this magnetic field intensity.

The average magnetic field intensity established in the separating chamber may be of any value up to about 10 Tesla, although it will generally be between 0.5 and 6 Tesla. The magnet may be a permanent magnet if the magnet field intensity required is of the order of 0.1 Tesla or a conventional electromagnet if the magnetic field intensity required is of the order of 1 Telsa. If a magnetic field intensity above about 2 Tesla is required, however, a superconducting electromagnet will generally have to be utilized.

The maximum relative permeability $\mu r$ of the ferromagnetic material is preferably greater than about $10^5$ (in S.I. units) and the saturation polarisation is preferably greater than about 0.5 Tesla. The ferromagnetic material is preferably easily demagnetised, that is it has a low remanence, so that magnetisable particles which are attracted to, and retained on, the field concentrating means when the separating chamber is within the magnetic field may be easily removed from the separating chamber out of the magnetic field.

The best ferromagnetic material for the field concentrating means is preferably high purity iron which has been worked in such a way that as many as possible of its constituent crystals are aligned in a preferred direction. In the case of such a material constituted by a single crystal, the maximum relative permeability $\mu r$ may be as high as $1.5 \times 10^6$ and the saturation polarisation may be approximately 2.16 Tesla. However, high purity iron is extremely expensive and a more feasible material would be a material containing approximately 99% iron by weight, the balance generally being carbon. It is also possible to utilize a material containing predominantly iron, but also containing a trace of silicon (less than 4% by weight), or even a nickel-iron alloy. Examples of suitable nickel-iron alloys are Supermumetal (manufactured by Telcon Metals, Crawley, England) which has a maximum relative permeability $\mu r$ of $0.25 - 1.00 \times 10^6$, at a field of approximately 1.2 A.m$^{-1}$, a saturation polarisation of approximately 0.80 Tesla and a remanence of 0.35 to 0.55 Tesla; and Superpermalloy (manufactured by ITT Components, Harlow, England), which has similar properties. Cobalt-iron alloys may also be used in certain circumstances. An example of a suitable cobalt-iron alloy is Supermendur (manufactured by Telecon Metals, Crawley, England) which has a maximum relative permeability $\mu r$ of approximately $10^5$, a saturation polarisation of approximately 2.40 Tesla and a remanence of approximately 2.3 Tesla.

The magnetisable material constituting the packing is preferably ferromagnetic and is advantageously constituted by an alloy steel in the ferritic or martensitic state having a chromium content in the range from 4 to 27% by weight. It may be in particulate or filamentary form. By way of example, filamentary magnetisable material may be in the form of a plurality of ferromagnetic filaments arranged substantially parallel to one another, of a mesh woven from ferromagnetic wires, of a corrosion-resistant steel wool, or of an expanded metal mat. Furthermore a particulate magnetisable material may be in the form of particles of substantially spherical, cylindrical or cubic shape, or of particles of a more irregular shape, such as, for example, that obtained when a block of corrosion-resistant material is subjected to the action of a milling machine. The magnetisable material may even be in the form of a metallic foam, such as can be made, for example, by electroplating carbon-impregnated foam rubber and then removing the rubber with a suitable solvent. If the packing is a stainless steel wool, about 2% to 10% of the total volume occupied by the packing is preferably occupied by the stainless steel wool of the packing, the remainder of the volume being void.

The means for removing the magnetisable particles from the packing may include flushing means for flushing a fluid through the separating chamber. In addition said means may include degaussing means, for example a degaussing coil, for reducing the residual magnetism of the packing within the separating chamber prior to flushing with a fluid. In order to perform the removal of the magnetisable particles from the packing, the magnet can either be de-energised or the separating chamber can be moved out of the zone in which the magnetic field is established. When the magnet is a superconducting electromagnet, it is preferable to keep the coil of the electromagnet energised all the time rather than switching the current on and off, since it requires energy to establish a current in a superconducting electromagnet coil, but once the current is established it is maintained with substantially no further direct consumption of energy, and to move the separating chamber out of the zone of the magnetic field to remove the magnetisable particles from the packing.

The magnetisable particles to be separated from the fluid may be either ferromagnetic or paramagnetic.

BRIEF DESCRIPTION OF THE DRAWINGS

For a better understanding of the invention, and to show more clearly how the same may be carried into effect, reference will now be made, by way of example, to the accompanying drawings, in which.

DETAILED DESCRIPTION OF THE DRAWINGS.

Figure 1:
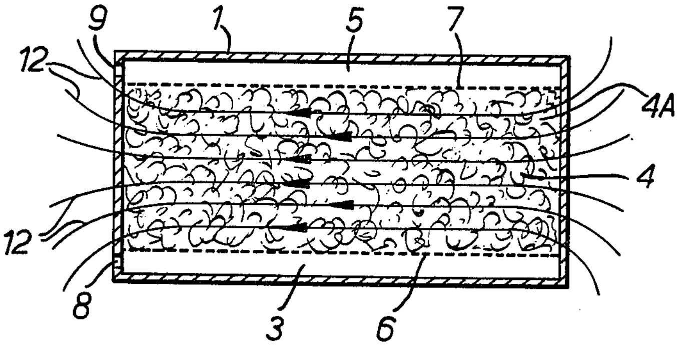
FIG. 1 is a diagrammatic view of a conventional separating chamber.
Figure 2:
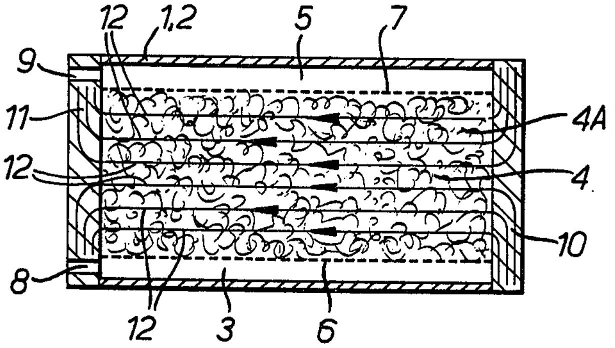
FIG. 2 is a diagrammatic view of a separating chamber for use in apparatus in accordance with the invention.
Figure 3:
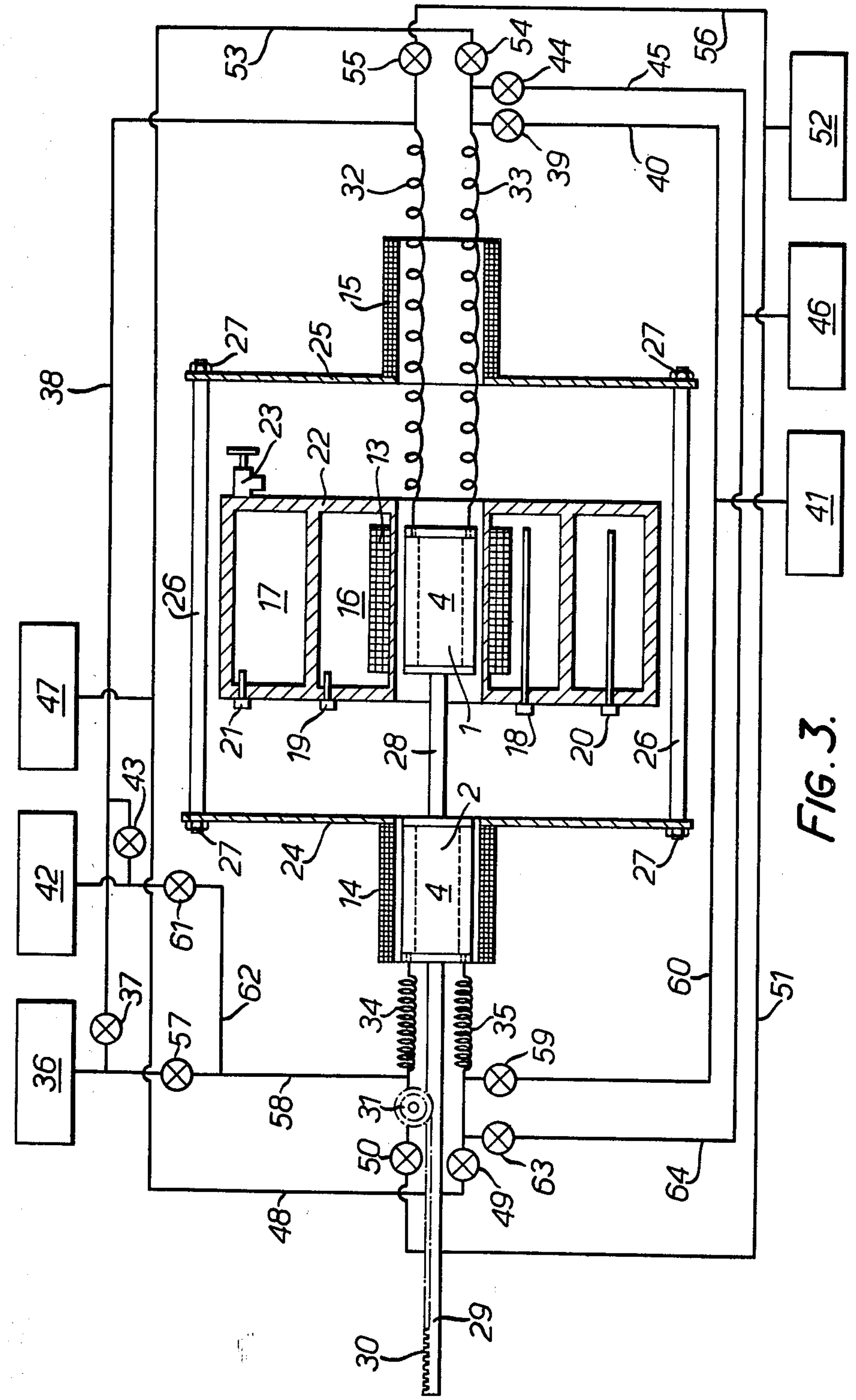
FIG. 3 shows schematically a magnetic separator incorporating two separating chambers as illustrated in FIG. 2.

Referring to FIGS. 1 and 2, each separating chamber 1, 2 is predominantly constituted by a substantially non-magnetisable material. Each separating chamber is cylindrical in shape and is divided internally into three intercommunicating compartments 3, 4 and 5 by means of foraminous plates 6 and 7. The central compartment is packed with a matrix 4A of corrosion-resistant steel wool. The lower compartment 3 is provided with an inlet 8 for feed slurry and the upper compartment 5 with an outlet 9 for magnetically treated slurry.

It can be seen that, in the case of the conventional separating chamber 1 of FIG. 1, the magnetic flux lines 12 of a magnetic field established within the separating chamber by an electromagnet coil (not shown) tend to fan out towards the end of the separating chamber and the average magnetic field intensity within the separating chamber is therefore less than the magnetic field intensity in the middle of the separating chamber.

In the separating chamber 1, 2 of FIG. 2, however, the two end walls 10 and 11 of the separating chamber each consist of soft iron plates which cause the magnetic flux lines 12 of a magnetic field established within the separating chamber by an electromagnet coil (not shown) to travel in a direction substantially parallel to the longitudinal axis of the separating chamber and then to turn sharply outwards as they enter the iron plates. The magnetic field intensity is therefore approximately constant throughout the length of the separating chamber. The ferromagnetic material used for the plates is conveniently soft iron, but other ferromagnetic materials such as the steel used for transformer cores or for electromagnet pole pieces would be suitable.

The magnetic separator comprises two separating chambers 1, 2 constructed in accordance with FIG. 2, the two separating chambers being movable between a first operative position and a second operative position. In the first operative position, separating chamber 1 lies in a zone in which an intense magnetic field is established by means of a superconducing electromagnet coil 13 wound in the form of a solenoid, and separating chamber 2 lies within a first degaussing coil 14 to which, in use, is supplied an alternating current whose amplitude is steadily reduced to zero. In the second operative position, separating chamber 2 lies within the zone of intense magnetic field and separating chamber 1 lies within a second degaussing coil 15. The superconducting electromagnet coil 13 is surrounded by a first annular channel 16 containing liquid helium which, in turn, is surrounded by a second annular chamber 17 containing liquid nitrogen. The chamber 16 is provided with an inlet conduit 18 for liquid helium and a vent 19 for helium vapour and chamber 17 is provided with an inlet conduit 20 for liquid nitrogen and a vent 21 for nitrogen vapour. Chambers 16 and 17 are both completely surrounded by a jacket 22 which is evacuated via a valve 23 which is connected to a suitable vacuum pump (not shown). All the walls of chambers 16 and 17 and jacket 22 are silvered on both sides to minimise the transmission of heat.

Circular soft iron shields 24 and 25 are provided, one on each side of the refrigerated electromagnetic assembly, and each has a central circular hole of diameter such that the separating chambers 1 and 2 will just slide through the hole. The soft iron shields are rigidly mounted by means of a plurality of threaded rods 26 which are secured to the shields by nuts 27.

The separating chambers 1 and 2 are rigidly connected together by means of a rod 28 and are movable between the first and second operative positions by a rod 29 fixed to a separating chamber 2 and provided with a rack 30 which co-operates with a pinion 31, which pinion can be rotated in either sense by means of electric motor (not shown).

Feed slurry may be introduced into the separating chamber 1 through a flexible hose 32 and magnetically treated slurry may leave the separating chamber 1 through a flexible hose 33. Corresponding flexible hoses 34 and 35 are provided for the separating chamber 2.

In operation of the separator, with the separating chambers 1, 2 in the first operative position, feed slurry flows from a reservoir 26 through a valve 37, into a conduit 38, and thence, by way of the flexible hose 32, into the separating chamber 1 where particles of relatively high magnetic susceptibility are extracted from the slurry and retained in the packing material 4A contained in the central compartment 4. Slurry containing predominantly particles of relatively low magnetic susceptibility passes from the packing material into the compartment 5, and leaves the separating chamber 1 by way of the flexible hose 33 whence it flows, by way of a valve 39 and a conduit 40, into a tank 41.

When the packing material within the separating chamber 1 has become substantially saturated with particles, the supply of feed slurry to the separating chamber is interrupted by closing the valve 37. The valve 39 is also closed, and clean water at low pressure is allowed to flow from a reservoir 42, by way of a valve 43, a conduit 38 and the flexible hose 32, into the separating chamber 1, thus rinsing out the separating chamber and packing material. All this time the magnetic field is maintained by the electromagnet coil. The clean water removes particles of relatively low magnetic susceptibility which may have become physically entrained in the packing material and the water containing these particles passes out of the separating chamber, by way of the flexible hose 33, a valve 44 and a conduit 45, to a tank 46.

While the operations of feeding and rinsing are being performed in the separating chamber 1, separating chamber 2 is substantially demagnetised by supplying to the degaussing coil 14 an alternating current, the amplitude of which is steadily reduced to zero. Meanwhile clean water at high pressure is supplied from a reservoir 47, by way of a conduit 48, a valve 49 and the flexible hose 35, to the separating chamber 2. The water passes through the packing material 4A contained in the central compartment 4 of the separating chamber 2 at high velocity in a direction opposite to that in which feed slurry is intended to be passed through the separating chamber, thus scouring away particles of relatively high magnetic susceptibility retained in the packing material when feed slurry was passed through the separating chamber 2. The water containing these particles leaves the separating chamber and passes, by way of the flexible hose 34, a valve 50 and a conduit 51, to a tank 52.

The separating chambers 1 and 2 are then moved from the first operative position to the second operative position by rotating the pinion 31 anticlockwise. Separating chamber 1 then lies within the degaussing coil 15 where it is substantially demagnetised by supplying the coil with alternating current, the amplitude of which is steadily reduced to zero. Meanwhile clean water at high pressure is passed through the packing material within the separating chamber 1 from the reservoir 47 by way of a conduit 53, a valve 54 and the flexible hose 33. The water containing particles of relatively high magnetic susceptibility leaving the separating chamber 1 passes, by way of the flexible hose 32, a valve 32, a valve 55 and a conduit 56, to the tank 52.

Meanwhile feed slurry flows from the reservoir 36 to separating chamber 2 by way of a valve 47, a conduit 58 and the flexible hose 34. The slurry containing predominantly particles of relatively low magnetic susceptibility leaving the separating chamber 2 passes, by way of the flexible hose 35, a valve 59 and a conduit 60, to the tank 41. When the packing material within the separating chamber 2 has become substantially saturated with particles, the supply of feed slurry is interrupted by closing the valve 57. The valve 59 is also closed, and clean water at low pressure is allowed to flow from the reservoir 42, by way of a valve 61, a conduit 62, the conduit 58 and the flexible hose 34, to the separating chamber 2. The water containing the particles of relatively low magnetic susceptibility which had become physically entrained in the packing material, or the "middlings" fraction, leaves, by way of the flexible hose 35, a valve 63 and a conduit 64, and enters the tank 46.

I claim:

1. Moving matrix apparatus for separating magnetisable particles from a fluid in which they are suspended, which apparatus comprises:

(a) a magnet for establishing a magnetic field in a first zone remote from a second zone;

(b) at least one elongate separating chamber having a fluid inlet and a fluid outlet therein, the separating chamber having at least portions thereof near each end each comprising a magnetic field concentrating element of ferromagnetic material;

(c) a fluid permeable packing of magnetisable material disposed in the separating chamber between the inlet and outlet thereof;

(d) means for moving the separating chamber including the field concentrating elements into, and out of, the first zone;

(e) means for passing fluid having magnetisable particles suspended therein through the separating chamber through the inlet thereof, when it is positioned within the first zone and a magnetic field is established in the first zone, so that magnetisable particles are magnetised by the magnetic field and attracted to, and retained in, the packing, whilst the fluid passes through the packing and exits through the outlet, and (f) means for removing the magnetisable particles retained in the packing, when the separating chamber is positioned in the second zone remote from the first zone.

2. Apparatus according to claim 1, wherein the magnetic field concentrating element comprises two parts which form the end walls of the separating chamber.

3. Apparatus according to claim 2, wherein the fluid inlet and the fluid outlet extend through at least one of the end walls.

4. Apparatus according to claim 3, wherein the fluid inlet is constituted by one or more apertures through one end wall, and the fluid outlet is constituted by one or more apertures through the other end wall.

5. Apparatus according to claim 2, wherein each end wall is constituted by a plate made of ferromagnetic material.

6. Apparatus according to claim 5, wherein the thickness of the plates is between 3 and 150 mm.

7. Apparatus according to claim 1, wherein the separating chamber is generally cylindrical in shape.

8. Apparatus according to claim 1, wherein the separating chamber is generally prismatic in shape.

9. Apparatus according to claim 1, wherein the ferromagnetic material constituting the field concentrating means has a coercivity less than $10^3$ A $m^{-1}$.

10. Apparatus according to claim 1, wherein the ferromagnetic material constituting the field concentrating means has a maximum relative permeability greater than $10^5$ (in S.I. units).

11. Apparatus according to claim 1 wherein the ferromagnetic material constituting the field concentrating means has a saturation polarisation greater than 0.5 Tesla.

12. Apparatus according to claim 1, wherein the feromagetic material constituting the field concentrating means contains at least 96% iron by weight.

13. Apparatus according to claim 1, wherein the ferromagnetic material constituting the field concentrating means is a nickel-iron alloy.

14. Apparatus according to claim 1, wherein the ferromagnetic material constituting the field concentrating means is a cobalt-iron alloy.

15. Apparatus according to claim 1, wherein the means for removing the magnetisable particles from the packing includes flushing means for flushing a fluid through the separating chamber.

16. Apparatus according to claim 15, wherein the means for removing the magnetisable particles from the packing includes magnetic degaussing means for reducing the residual magnetism within the separating chamber.

17. Apparatus according to claim 1, wherein the magnet is a superconducting electromagnet.

* * * * *